United States Patent [19]
Kim

[11] Patent Number: 5,583,672
[45] Date of Patent: Dec. 10, 1996

[54] PROCESS FOR FORMING LIQUID CRYSTAL LAYER OF PDLCD BY FORMING LAYERS OF POLYMER, LIQUID CRYSTAL AND POLYMER IN THAT ORDER

[75] Inventor: Kwang-su Kim, Kyunggi-do, Rep. of Korea

[73] Assignee: Samsung Electron Devices Co., Ltd., Rep. of Korea

[21] Appl. No.: 158,898

[22] Filed: Nov. 29, 1993

Related U.S. Application Data

[63] Continuation-in-part of Ser. No. 791,885, Nov. 13, 1991, abandoned.

[51] Int. Cl.$^6$ .................................................. G02F 1/1333
[52] U.S. Cl. .................................................. 349/92; 359/52
[58] Field of Search .................................. 359/51, 52

[56] References Cited

U.S. PATENT DOCUMENTS

| | | | |
|---|---|---|---|
| 3,872,050 | 3/1975 | Benton et al. | 359/52 |
| 4,810,063 | 3/1989 | Fergason | 359/51 |
| 4,890,902 | 1/1990 | Doane et al. | 359/51 |
| 5,132,815 | 7/1992 | Fergason | 359/51 |
| 5,155,607 | 10/1992 | Inoue et al. | 359/51 |
| 5,156,452 | 10/1992 | Drzaic et al. | 359/51 |
| 5,194,973 | 3/1993 | Isogai et al. | 359/53 |
| 5,253,090 | 10/1993 | Yamazaki et al. | 359/51 |

*Primary Examiner*—Anita Pellman Gross
*Attorney, Agent, or Firm*—Christie, Parker & Hale, LLP

[57] ABSTRACT

To uniform the liquid crystal particle of the liquid crystal layer of a PDLCD where a liquid crystal is scattered and emulsified with a polymer, the polymer is scattered on a conductive layer of a substrate. The liquid crystal is scattered thereon to be emulsified during a predetermined hour. Thereafter, by the same method as that of forming the polymer layer, the polymer is scattered on the liquid crystal layer to form a second polymer layer thereby obtaining the homogeneous thickness of the liquid crystal layer of the PDLCD.

4 Claims, 3 Drawing Sheets

PROCESS FOR FORMING LIQUID CRYSTAL LAYER OF PDLCD BY FORMING LAYERS OF POLYMER, LIQUID CRYSTAL AND POLYMER IN THAT ORDER

CROSS-REFERENCE TO RELATED APPLICATION

This application is a continuation-in-part of application Ser. No. 07/791,885, filed Nov. 13, 1991, now abandoned.

FIELD OF THE INVENTION

The present invention relates to a process for forming a liquid crystal layer and, more particulary to a method for forming a liquid crystal layer of PDLCD (polymer dispersed liquid crystal display).

BACKGROUND OF THE INVENTION

Conventionally, a liquid crystal display is formed with a spacer dispersed and interposed between two sheets of material comprising a transparent electrode and a crystal oriented layer to form a predetermined space into which a liquid crystal is injected. Thereafter, a polarizing panel is attached to the outer surface of a substrate. Despite the complex fabrication process, response speed and contrast of the display region is not good. Moreover, with the limited display region, it is impossible to form large area displays.

A PDLCD (polymer dispersed liquid crystal display) which can be simply fabricated and is suitable for making very large display area was introduced by a report of American Institute of Physics published in 1986 as NCAP (nematic curvilinear aligned phase). The PDLCD described therein consists of nematic liquid crystal dispersed in a polymer film in the shape of droplet. Light passing through the film in the absence of an applied electric field is intercepted, giving an opaque film. Application of an electric field across the liquid crystal/polymer places the film in a highly transparent state. The PDLCD technology possesses many advantages in comparison with other liquid crystal technologies. One of the great advantages is the ability to make large liquid crystal devices, potentially square meters in size, since the polymer protects nematic liquid crystals from the environment. There is no need of forming an oriented layer in the substrate, as the polymer defines the alignment of the contained liquid crystal. In addition, polarizers need not be used by using polymer whose refractive index is similar to that of liquid crystals.

The processes used in constructing the PDLCD are quite simple. The simplest method consists of the steps such that, a nematic liquid crystal is dispersed in a water-borne polymer to form an emulsion, the emulsion is applied as a coating onto a conductive transparent substrate, such as indium tin oxide (ITO) coated polymer, and film is allowed to dry, and then laminated to another piece of conductive substrate to give a finished cell.

However, the PDLCD has the well-known problem that during forming the emulsion by mixing and stirring the nematic crystal and the polymer, the liquid crystal particles are not distributed uniformly in the emulsion and the layer of liquid crystal particles are not present as a layer of uniform thickness.

Other means exist for generating polymer-surrounded nematic droplets that result in similar electro-optical films. One method is to microencapsulate the emulsified nematic droplets with the polymer shell immediately after forming the emulsions microcapsulated, and then to suspend these encapsulated droplets in some binder material to form a film. In another method, a mixture of nematic liquid crystal and a prepolymer is made to form the uniform liquid crystal particle with a coated film. However, these methods have disadvantages of causing the complex processes.

SUMMARY OF THE INVENTION

Accordingly, a feature of the present invention is a process for forming a liquid crystal layer of a PDLCD having uniform thickness by forming a uniform liquid crystal particle. In accordance with the invention there is provided a process for forming a polymer-dispersed liquid crystal display element comprising the steps of:

forming a first polymer layer by scattering liquid polymer on a predetermined area of a substrate;

forming a liquid crystal layer by scattering liquid crystals of predetermined droplet size on the polymer layer; and forming a second polymer layer by scattering liquid polymer upon the liquid crystal layer whereby the liquid polymer permeates among the droplets of liquid crystal so that droplets of liquid crystal are interposed within the polymer of said first and second polymer layers, thereby forming a dispersion of liquid crystal droplets in polymer.

BRIEF DESCRIPTION OF THE DRAWINGS

Further advantages and features of the present invention will be apparent in the following detailed description in connection with the accompanying drawings, in which:

FIG. 1 is a sectional view of a substrate;

FIG. 2 is a sectional view of a scattering device;

FIG. 3 is a sectional view of a first polymer layer coated on a substrate of FIG. 1;

FIG. 4 is a sectional view of a liquid crystal layer coated on a first polymer layer of FIG. 3;

FIG. 5 is a sectional view of a second polymer layer coated on a liquid crystal layer of FIG. 4; and FIG. 6 is a sectional view of a PDLCD formed by piling another substrate on the one of FIG. 5.

DETAILED DESCRIPTION OF THE PREFERRED EMBODIMENT

Figure 1:
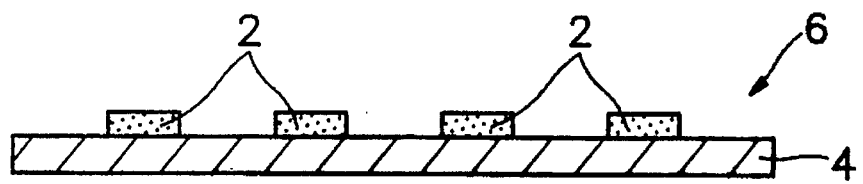
FIGS. 1 to 6 show the process of the present invention.
Figure 2:
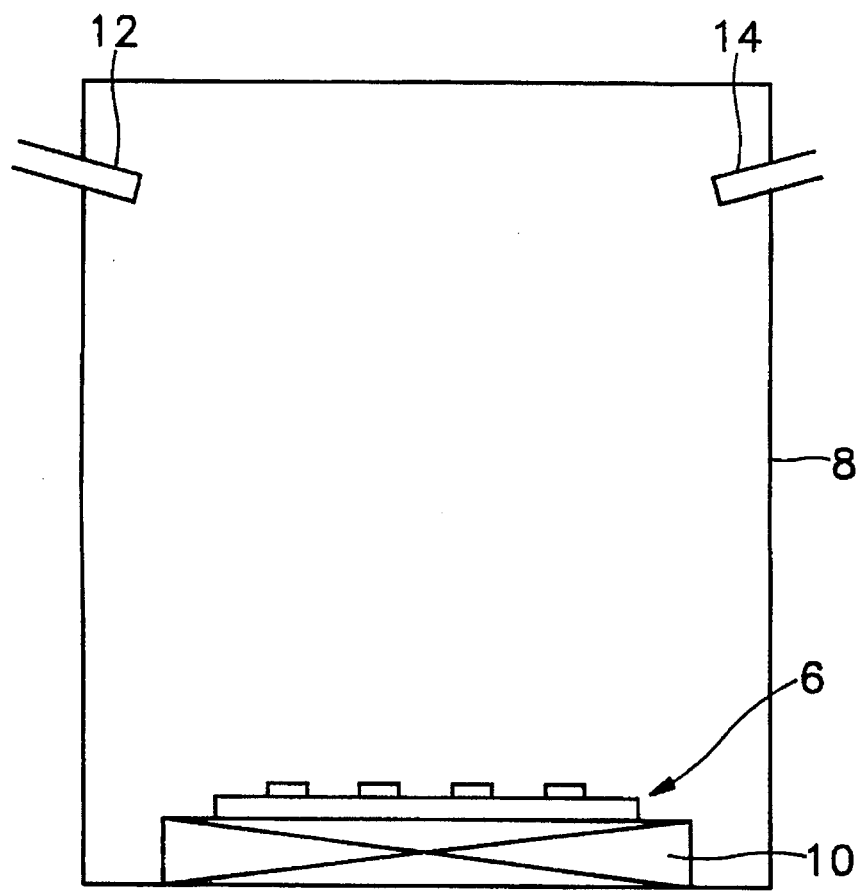
Figure 3:
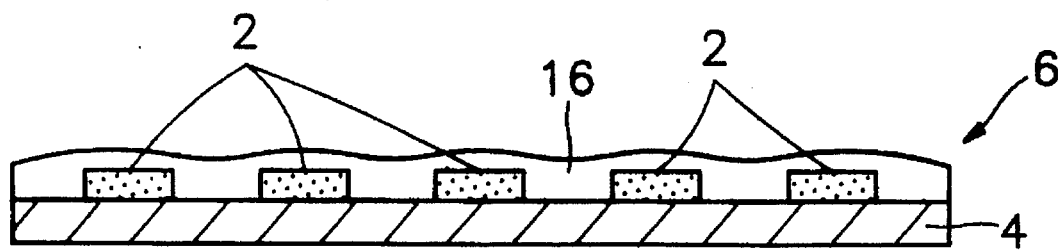
Figure 4:
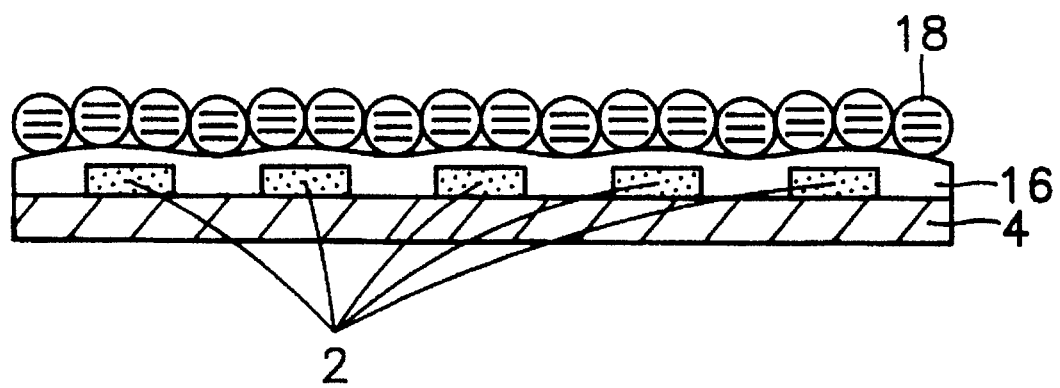
Figure 5:
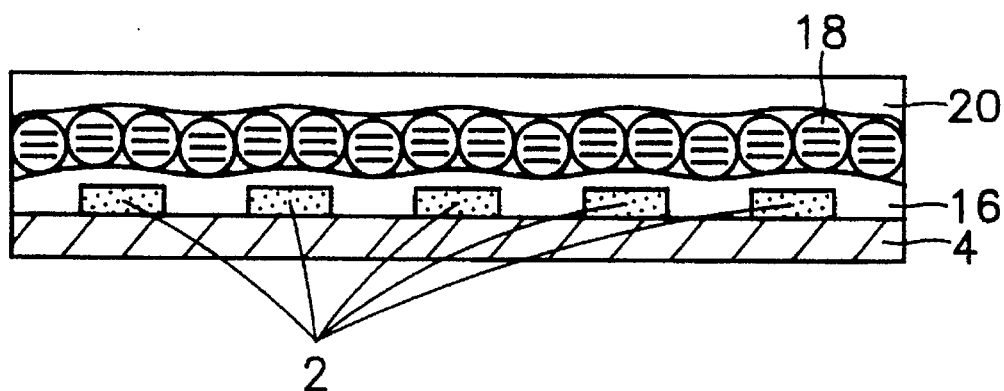

A conductive layer, such as an indium tin oxide (ITO) layer, is formed on a base panel 4 to form a substrate 6 as shown in FIG. 1 in accordance with the conventional method. The internal atmosphere of a scattering device of FIG. 2 is maintained at 80° to 90° C. and the atmospheric pressure. The substrate 6 is placed on a heater 10 inside the scattering device 8. First, polymer in a solvent is scattered thereon by means of a polymer nozzle 12. The thickness of a polymer layer formed on the substrate 6 is about 4 to 5 μm, preferably about 3 μm. During the scattering process, the heater 10 helps to evaporate the solvent in the scattered polymer by heating the substrate 6 to about 90° C. In the first scattering step, the diameter of the polymer nozzle 12 is preferably 3 to 7 μm and the scattering pressure is preferably 50 to 150 kg/cm$^2$. As polymer, any polymer, e.g. liquid polyvinyl alcohol or polyester, can be used that has a refractive ratio equal to that of a liquid crystal to be coated thereon later.

When a second scattering is performed through a liquid crystal nozzle 14 of the scattering device 8, the liquid crystal layer 18 is coated on the first polymer layer 16. The thickness of the liquid crystal is advantageously 2 to 3 μm, preferably 3 μm. Thereafter, it is left alone for 2 to 5 hours, preferably 3 hours, and the polymer particles of the droplet form and the liquid crystal particles of the droplet form are physically combined. Advantageously, a liquid crystal scattering nozzle is used with a diameter of 3 to 7 μm and a scattering pressure of 50 to 150 kg/cm$^2$.

Thereafter, a third scattering step is performed by the same method and under the same condition as those of the first scattering step to form a second polymer layer 20 having a thickness advantageously of 4 to 5 μm, preferably 3 to 3 μm. As a result, the liquid polymer permeates among the droplets of liquid crystal, and the droplets of liquid crystal are interposed within the polymer of the first and second polymer layers 16 and 20 thereby.

The temperature of the above steps is maintained at about 80° to 90° C. under atmospheric pressure. The thickness of polymer and liquid crystal layers formed by scattering can be adjusted by adjusting the scattering time and frequency.

Figure 6:
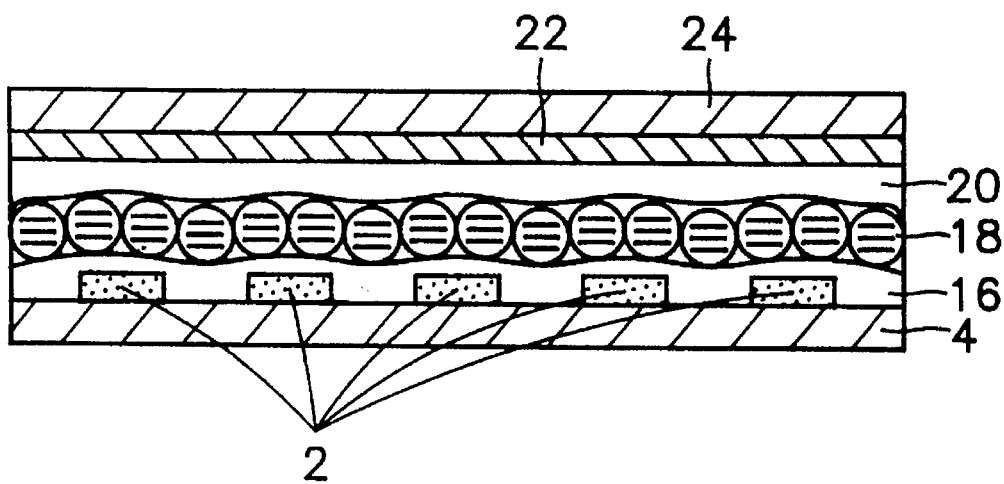

As a further example, a substrate 24 having a conductive layer 22 corresponding to the ITO layer 2 of FIG. 6 is additionally placed on the assembly described above having substrate 4, and the liquid crystal layer 3 interposed between the first and second polymer layer 16 and 20. It is sealed therearound in accordance with a conventional method to form a liquid crystal display element.

As described above, the present invention provides the liquid crystal layer of the PDLCD such that the liquid polymer and the liquid crystal are respectively scattered to be coated in the predetermined uniform thickness to obtain the homogeneous thickness of the liquid crystal layer other than by a method in which the coating is performed after stirring and mixing the liquid polymer and the liquid crystal thereby noticeably improving the contrast of the element.

What is claimed is:

1. A process for forming a polymer dispersed liquid crystal display element comprising the steps of:

preparing a liquid polymer comprising a polymer and solvent, forming a first polymer layer by scattering liquid polymer on a predetermined area of a substrate;

forming a liquid crystal layer by scattering liquid crystals of predetermined droplet size on the polymer layer; and forming a second polymer layer by scattering liquid polymer upon the liquid crystal layer whereby the liquid polymer permeates among the droplets of liquid crystal so that droplets of liquid crystal are interposed within the polymer of said first and second polymer layers, thereby forming a dispersion of liquid crystal droplets in polymer.

2. The process as claimed in claim 1 further comprising allowing said polymer and liquid crystal to stand undisturbed for about 2 to 5 hours after forming the liquid crystal layer on the first polymer layer and before forming the second polymer layer upon the liquid crystal layer.

3. The process as claimed in claim 1, wherein the thickness of each of the first and second polymer layer is about 4 to 5 μm.

4. The process as claimed in claim 1, wherein the thickness of the liquid crystal layer is about 2 to 3 μm.

* * * * *